US012488978B2

(12) United States Patent
Kodera

(10) Patent No.: US 12,488,978 B2
(45) Date of Patent: Dec. 2, 2025

(54) DIGITAL LINEAR ION TRAP AND METHOD FOR OPERATING THE SAME

(71) Applicant: SHIMADZU CORPORATION, Kyoto (JP)

(72) Inventor: Kei Kodera, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 319 days.

(21) Appl. No.: 17/719,454

(22) Filed: Apr. 13, 2022

(65) Prior Publication Data

US 2023/0335388 A1 Oct. 19, 2023

(51) Int. Cl.
*H01J 49/42* (2006.01)
*H01J 49/16* (2006.01)

(52) U.S. Cl.
CPC .......... *H01J 49/422* (2013.01); *H01J 49/161* (2013.01)

(58) Field of Classification Search
CPC ...... H01J 49/161; H01J 49/422; H01J 49/423; H01J 49/0031; H01J 49/0027
See application file for complete search history.

(56) References Cited

U.S. PATENT DOCUMENTS 6,797,950 B2 9/2004 Schwartz et al.
2007/0176095 A1* 8/2007 Tong .................... H01J 49/423 250/292
2008/0035842 A1* 2/2008 Sudakov ............... H01J 49/423 250/287
2012/0223223 A1 9/2012 Sugiyama et al.
2015/0097115 A1* 4/2015 Schwartz ............ H01J 49/4215 250/283
2016/0163529 A1* 6/2016 Chen ..................... H01J 49/161 250/283
2016/0365231 A1* 12/2016 Xu ...................... H01J 49/0081
2020/0090921 A1* 3/2020 Hazama ................ H01J 49/424

FOREIGN PATENT DOCUMENTS

CN 101373695 A * 2/2009
JP 2012-184975 A 9/2012

OTHER PUBLICATIONS

Notice of Allowance dated Nov. 8, 2022 issued for the corresponding Japanese Patent Application No. 2019-182973.
Zheng Ouyang, et al., "Rectilinear Ion Trap: Concepts, Calculations, and Analytical Performance of a New Mass Analyzer", Analytical Chemistry, vol. 76, No. 16, Aug. 15, 2004, pp. 4595-4605.

* cited by examiner

*Primary Examiner* — David E Smith
(74) *Attorney, Agent, or Firm* — Sughrue Mion, PLLC

(57) ABSTRACT

In order to simplify a power circuit, a linear ion trap (2) according to the present invention includes: two first rod electrodes (21, 22) facing each other across a central axis (C), each of the first rod electrodes having an opening (21*a*, 22*a*); two second rod electrodes (23, 24) facing each other across the central axis, in a direction different from the direction in which the two first rod electrodes face each other; and a pair of end electrodes (25, 26) respectively arranged outside the two end faces of the two first rod electrodes and the two second rod electrodes. A controller (7) is provided to control a radio-frequency voltage supplier (4) which applies a radio-frequency voltage for capturing ions to each of the two second rod electrodes, and an excitation voltage supplier (5) which applies a voltage for resonance excitation to each of the two first rod electrodes.

8 Claims, 3 Drawing Sheets

DIGITAL LINEAR ION TRAP AND METHOD FOR OPERATING THE SAME

TECHNICAL FIELD

The present invention relates to a linear ion trap and a method for operating the same.

BACKGROUND ART

A mass spectrometer employing an ion trap which holds ions by an effect of an electric field has been known as one type of mass spectrometer. There are two major types of ion traps used in mass spectrometers: a three-dimensional quadrupole ion trap and a linear ion trap. Any ion trap has a plurality of electrodes surrounding a space within which ions are to be captured. Generally speaking, linear ion traps provide a larger space for capturing ions than three-dimensional quadrupole ion traps.

A linear ion trap includes four rod electrodes arranged substantially parallel to each other so as to surround the space for capturing ions, as well as a pair of end electrodes (end-cap electrodes) respectively arranged outside the two end faces of the rod electrodes (see Patent Literatures 1 and 2). Normally, two of the four rod electrodes are arranged so as to face each other in a specific direction (X-axis direction) across the central axis of the capturing space, while the two remaining rod electrodes are arranged so as to face each other across the same central axis, in another direction (Y-axis direction) orthogonal to the X-axis direction. An ion ejection port is formed in a rod electrode of one of the two sets of rod electrodes. An ion introduction port is formed in one or both of the pair of end electrodes.

When ions are to be captured within the inner space of the linear ion trap, a direct voltage having the same polarity as the ions is applied to the pair of end electrodes, while two radio-frequency voltages having a phase difference of 180 degrees are respectively applied to the two pairs of rod electrodes facing each other in the X-axis and Y-axis directions. The ions introduced into the space surrounded by the four rod electrodes through the ion introduction port or ports formed in one or both of the end electrodes are captured within the same space by the effect of those voltages.

When the ions captured within the inner space are to be sequentially separated and detected according to their mass-to-charge ratios, the frequency or amplitude of the radio-frequency voltages applied to the two pairs of rod electrodes is controlled, and an excitation voltage is superposed on the radio-frequency voltage applied to one pair of rod electrodes, to induce resonance excitation of an ion having a specific mass-to-charge ratio. The resonance-excited ion significantly oscillates in bilateral directions substantially orthogonal to the central axis of the linear ion trap, to be ultimately ejected to the outside through the ion ejection port formed in the rod electrode. An ion detector is placed on the outside of the ion ejection port. The ion detector produces a detection signal corresponding to the number of ions which have reached the detector.

CITATION LIST

Patent Literature

Patent Literature 1: U.S. Pat. No. 6,797,950 B
Patent Literature 2: JP 2012-184975 A

SUMMARY OF INVENTION

Technical Problem

The conventional linear ion trap configured in this manner requires a complex power circuit for applying radio-frequency voltages having a phase difference of 180 degrees to the two pairs of rod electrodes so as to capture ions, and for superposing the voltage for resonance excitation on the radio-frequency voltage applied to one of the two pairs of rod electrodes so as to make ions oscillate by resonance excitation.

The objective of the present invention is to simplify the power circuit for the linear ion trap.

Solution to Problem

The first mode of the present invention is a linear ion trap, including:

- two first rod electrodes arranged so as to face each other across a central axis, each of the first rod electrodes having an opening;
- two second rod electrodes arranged so as to face each other across the central axis, in a direction different from the direction in which the two first rod electrodes face each other;
- a pair of end electrodes respectively arranged outside the two end faces of the two first rod electrodes and the two second rod electrodes;
- a radio-frequency voltage supplier configured to apply a radio-frequency voltage for capturing ions to each of the two second rod electrodes;
- an excitation voltage supplier configured to apply a voltage for resonance excitation to each of the two first rod electrodes; and
- a controller configured to control the radio-frequency voltage supplier and the excitation voltage supplier.

The second mode of the present invention is a method for operating a linear ion trap including: two first rod electrodes arranged so as to face each other across a central axis, each of the first rod electrodes having an opening; two second rod electrodes arranged so as to face each other across the central axis, in a direction different from the direction in which the two first rod electrodes face each other; and a pair of end electrodes respectively arranged outside of the two end faces of the two first rod electrodes and the two second rod electrodes, the method including:

- applying, to each of the two second rod electrodes, a radio-frequency voltage having a predetermined frequency corresponding to the mass-to-charge ratio of an ion to be captured, when an ion is to be captured within an inner space of the linear ion trap; and
- applying a voltage for resonance excitation to each of the two first rod electrodes while applying the radio-frequency voltage to each of the two second rod electrodes, when an ion captured within the inner space of the linear ion trap is to be ejected.

Advantageous Effects of Invention

In the linear ion trap according to the first mode of the present invention, an opening is formed in each of the two first rod electrodes. One of the two openings serves as an ion introduction port, and one or both of the openings serve as an ejection port or ports. No opening for introducing ions is formed in the pair of end electrodes.

When an ion or ions are to be captured within the inner space of the linear ion trap, the radio-frequency voltage for capturing ions is applied to the two second rod electrodes by the radio-frequency voltage supplier. When an ion captured within the inner space is to be ejected, the voltage for resonance excitation is applied to the two first rod electrodes by the excitation voltage supplier, while the radio-frequency voltage for capturing ions is applied to the two second rod electrodes by the radio-frequency voltage supplier. An ion having a mass-to-charge ratio corresponding to the frequency of the radio-frequency voltage is thereby made to oscillate in an orthogonal direction to the central axis, to be ejected from one or both of the openings in the two first rod electrodes. Since the rod electrodes to which the radio-frequency voltage for capturing ions is applied are separated from the rod electrodes to which the voltage for resonance excitation is applied, the power circuit in the linear ion trap according to the first mode can be simple in configuration.

DESCRIPTION OF EMBODIMENTS

An ion trap mass spectrometer including a linear ion trap as one embodiment of the present invention is hereinafter described with reference to the drawings.

Figure 1:
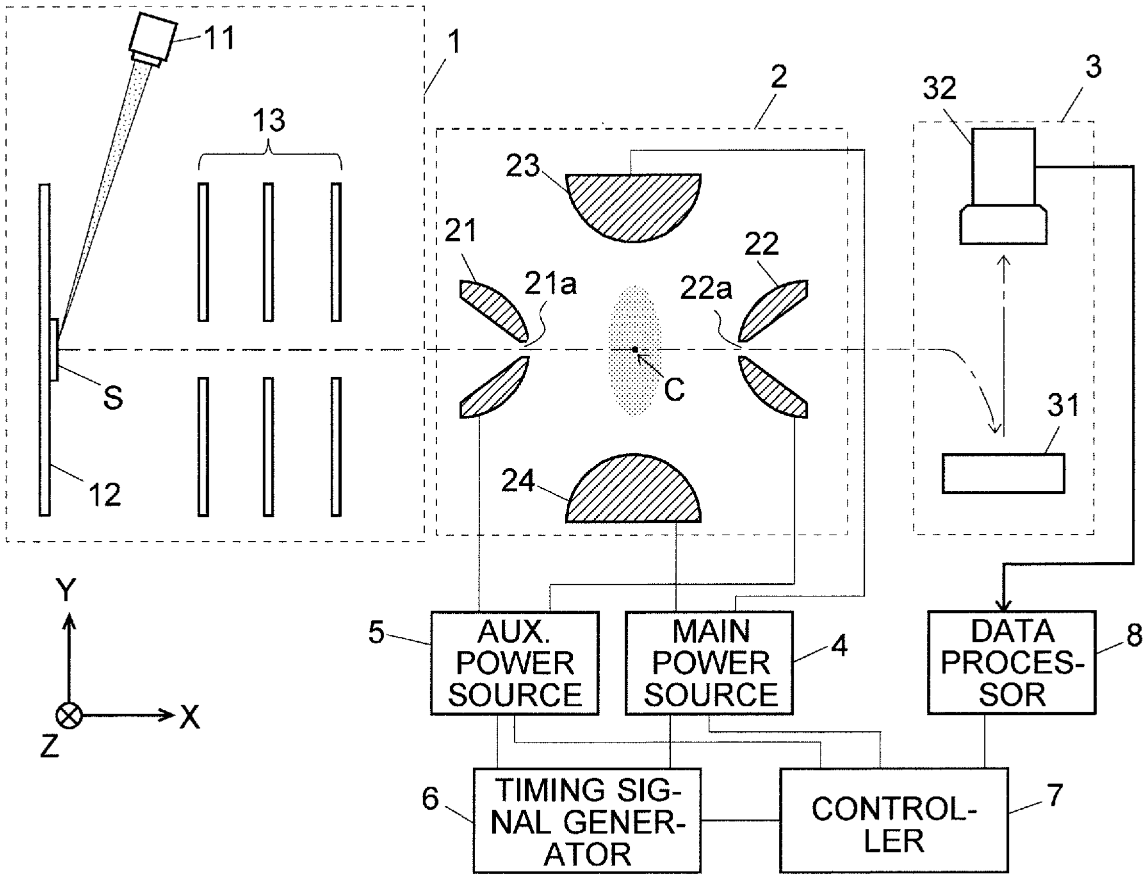
FIG. 1 is a schematic configuration diagram of a linear ion trap mass spectrometer as one embodiment of the present invention.
Figure 2:
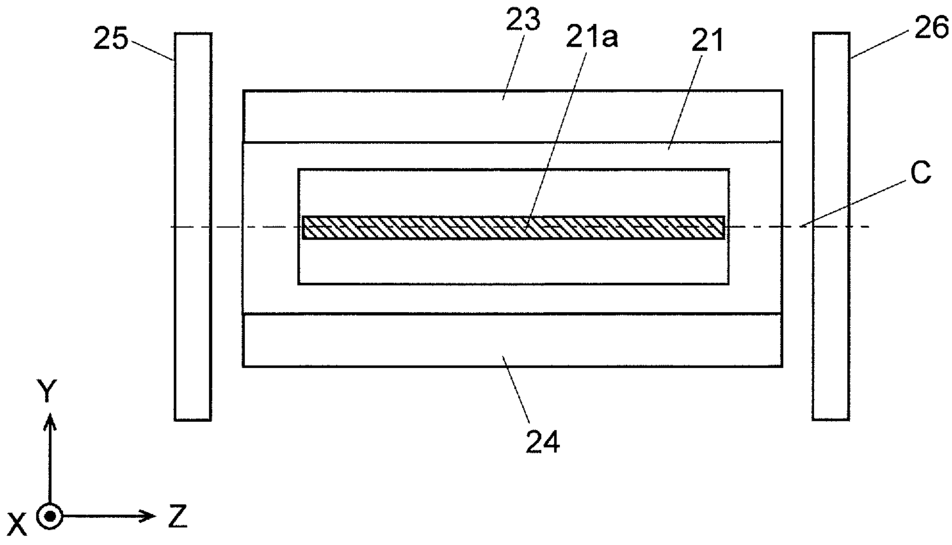
FIG. 2 is a schematic configuration diagram of the linear ion trap in FIG. 1.

FIG. 1 is a schematic configuration diagram of the ion trap mass spectrometer according to the present embodiment. FIG. 2 is a schematic configuration diagram of the linear ion trap in FIG. 1. The ion trap mass spectrometer according to the present embodiment includes an ionizer 1 configured to ionize a target sample, a linear ion trap 2 configured to separate ions according to their mass-to-charge ratios m/z, an ion detector 3, a main power source 4, an auxiliary power source 5, a timing signal generator 6, a controller 7, and a data processor 8.

The ionizer 1 employs a matrix-assisted laser desorption/ionization (MALDI) method and includes a laser irradiator 11 configured to emit pulsed laser light, a sample plate 12 to which a specimen S containing a target sample component is adhered, and an ion transport system 13 configured to extract ions released from specimen S due to the irradiation with the laser light and guide the ions in a predetermined direction, as well as other related components. In the following descriptions, the direction in which ions are guided by the ion transport system 13 is called the "X-axis" direction, along with the "Y-axis" and "Z-axis" directions both of which are orthogonal to the X-axis direction, where the Z-axis direction corresponds to the direction perpendicular to the drawing sheet of FIG. 1. As for the ion transport system 13, an einzel lens can be used, for example, although other appropriate configurations may also be adopted. An ionization method different from the MALDI may be used.

The linear ion trap 2 includes four rod electrodes 21, 22, 23 and 24 arranged parallel to each other around the central axis C extending in the X-axis direction, with their inner surfaces shaped like hyperbolae in the cross section. Among the four rod electrodes 21, 22, 23 and 24, the two rod electrodes 21 and 22 face each other in the X-axis direction across the central axis C, while the two rod electrodes 23 and 24 face each other in the Y-axis direction across the central axis C. The linear ion trap 2 in FIG. 1 is shown by a cross-sectional view in which the rod electrodes 21, 22, 23 and 24 are cut at a plane orthogonal to the central axis C (X-Y plane).

The two rod electrodes 21 and 22 have an introduction port 21*a* and an ejection port 22*a*, respectively, each of which is an elongated opening extending in the Z-axis direction. Accordingly, the rod electrodes 21 and 22 correspond to the first rod electrodes in the present invention, while the rod electrodes 23 and 24 correspond to the second rod electrodes. Outside the two ends of the rod electrodes 21, 22, 23 and 24, a pair of end electrodes 25 and 26 having a substantially circular shape are arranged so that the rod electrodes 21, 22, 23 and 24 are sandwiched in between. No opening is formed in these end electrodes 25 and 26.

The ion detector 3 includes a conversion dynode 31 configured to convert ions into electrons as well as a secondary electron multiplier tube 32 configured to multiply and detect electrons coming from the conversion dynode 31. The ion detector 3 produces a detection signal corresponding to the amount of ions it has received, and sends the signal to the data processor 8. The data processor 8 has the function of creating a mass spectrum based on the detection signals obtained in the ion detector 3 for various kinds of ions sequentially ejected from the linear ion trap 2 while being separated from each other by their mass-to-charge ratios.

Figure 3:
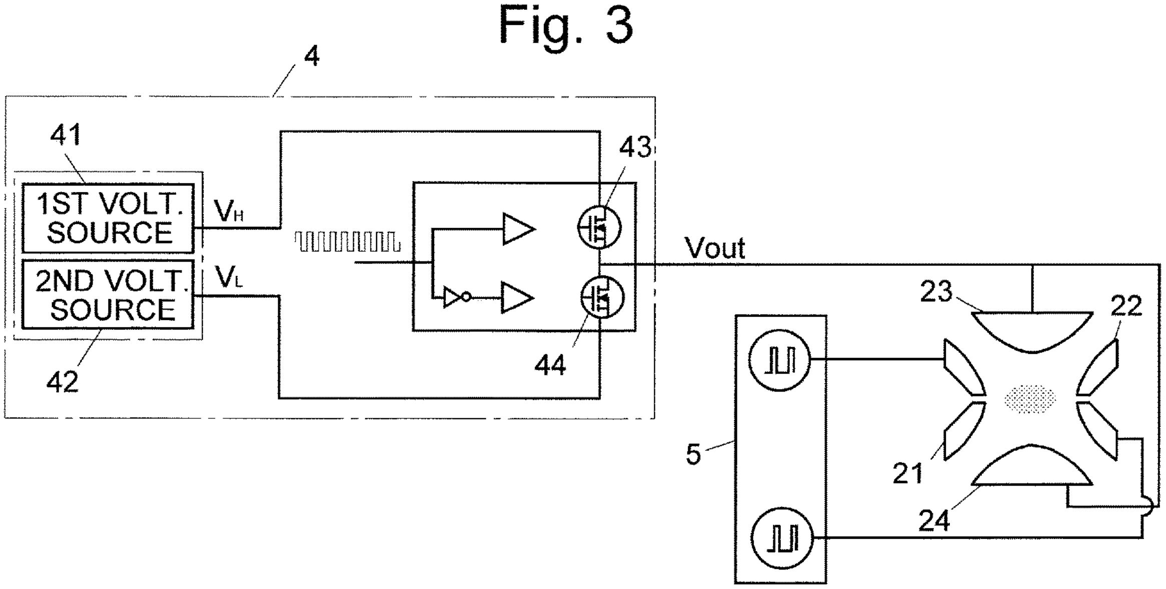
FIG. 3 is a power circuit diagram for the linear ion trap.

The main power source 4, which correspond to the radio-frequency voltage supplier in the present invention, applies a high rectangular voltage for capturing ions to the rod electrodes 23 and 24 in the linear ion trap 2. As shown in FIG. 3, the main power source 4 includes a first voltage source 41 for generating first voltage $V_H$ and a second voltage source 42 for generating second voltage $V_L$ (where $V_L<V_H$), as well as a first switching element 43 and a second switching element 44 connected in series between the output terminal of the first voltage source 41 and that of the second voltage source 42.

The timing signal generator 6 generates drive pulses for controlling the on/off state of the first and second switching elements 43 and 44, as well as gives those pulses to the main power source 4. Those pulses drive the first and second switching elements 43 and 44 to alternately turn to the on state. When the first switching element 43 is in the on state, the first voltage $V_H$ is sent to the output. When the second switching element 43 is in the on state, the second voltage $V_L$ is sent to the output. Accordingly, under ideal conditions, the output voltage Vout will be a rectangular voltage which alternates between the high level $V_H$ and the low level $V_L$ with a predetermined frequency f (period 1/f). Normally, $V_H$ and $V_L$ are high voltages identical in absolute value and opposite in polarity. Their absolute value is approximately within a range from several hundred volts to 1 kilovolt. The frequency f is normally within a range from several tens of kHz to several MHz. When the frequency of the pulses for driving the switching elements 43 and 44 is changed by the timing signal generator 6, the rectangular voltage changes its frequency while maintaining its amplitude (voltage level) at the same level.

The timing signal generator 6 feeds the auxiliary power source 5 with pulse signals formed by dividing the frequency of the drive pulses supplied to the main power source 4 with an appropriate ratio. Based on the signals fed from the timing signal generator 6, the auxiliary power source 5 generates a low rectangular voltage of frequency f/n (provided that the division ratio is 1/n) and pulse width d, with a low level of 0 V and a high level of $+V_1$, as well as another low rectangular voltage whose polarity is opposite to that of the counterpart. The generated low rectangular voltages are applied to the rod electrodes 21 and 22 in the linear ion trap 2. Normally, the voltage value $V_1$ of the low rectangular voltages is much lower than the voltage values $V_H$ and $V_L$ of the high rectangular voltage; for example, $V_1$ is several volts. The auxiliary power source 5 corresponds to the excitation voltage supplier in the present invention. The low rectangular voltages generated in the auxiliary power source 5 correspond to the voltage for resonance excitation in the present invention.

The controller 7 includes a personal computer as its main component, with its functions realized by executing a controlling/processing program previously installed on the personal computer.

Figure 4A:
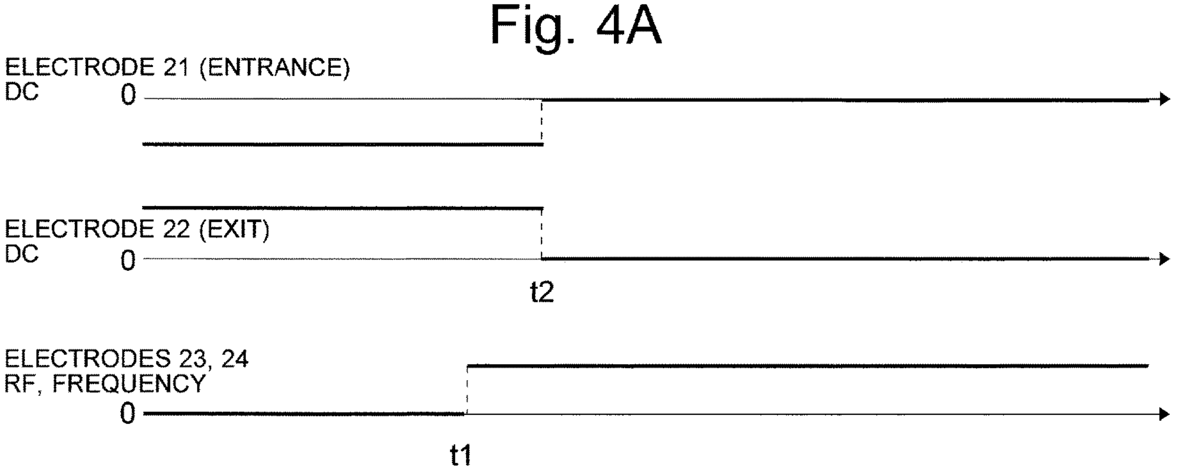
FIG. 4A is a chart showing the voltages applied to the respective electrodes when ions are to be introduced and captured.

A mass spectrometric operation in the mass spectrometer according to the present embodiment is hereinafter described with reference to FIGS. 4A-4C.

In the ionizer 1, a beam of laser light is emitted from the laser irradiator 11 to irradiate specimen S with this light. Due to the irradiation with the laser light, the matrix in specimen S is rapidly heated and vaporized along with the target component, to be ultimately turned into ions. The generated ions are converged by the electrostatic field formed by an ion lens in the ion transport system 13 and introduced through the introduction port 21*a* into the inner space surrounded by the rod electrodes 21, 22, 23 and 24. In this stage, direct voltages of opposite polarities are respectively applied to the rod electrodes 21 and 22, while no voltage is applied to the rod electrodes 23 and 24. The end electrodes 25 and 26 are maintained at the ground potential (see FIG. 4A).

After a predetermined period of time (t1) has passed since the introduction of the ions into the linear ion trap 2, the timing signal generator 6 supplies drive pulses of a predetermined frequency to the switching elements 43 and 44 according to an instruction from the controller 7. A high rectangular voltage having the corresponding frequency is thereby generated in the main power source 4 and applied to the rod electrodes 23 and 24. Consequently, a radio-frequency electric field is formed within the inner space. Due to the effect of this radio-frequency electric field, ions having a predetermined range of mass-to-charge ratios are captured within the linear ion trap 2. The ions are also cooled by coming in contact with cooling gas which has been introduced into the inner space in advance of the introduction of the ions.

After a predetermined period of time (t2) has passed since the introduction of the ions into the linear ion trap 2, the auxiliary power source 5 discontinues the application of the direct voltages to the rod electrodes 21 and 22 according to an instruction from the controller 7. Under this condition, the ions within the linear ion trap 2 are captured in a stable manner.

Figure 4B:
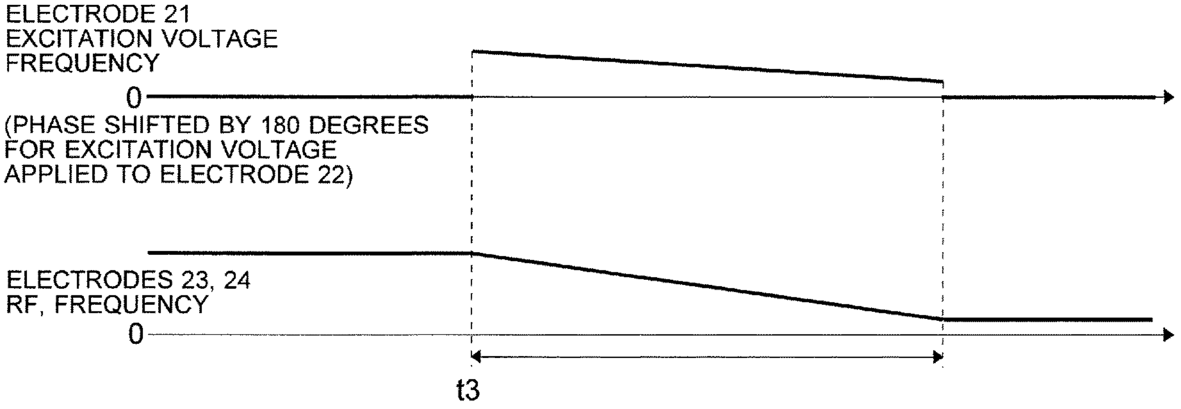
FIG. 4B is chart showing the voltages respectively applied to the electrodes when ions are to be ejected.
Figure 4C:
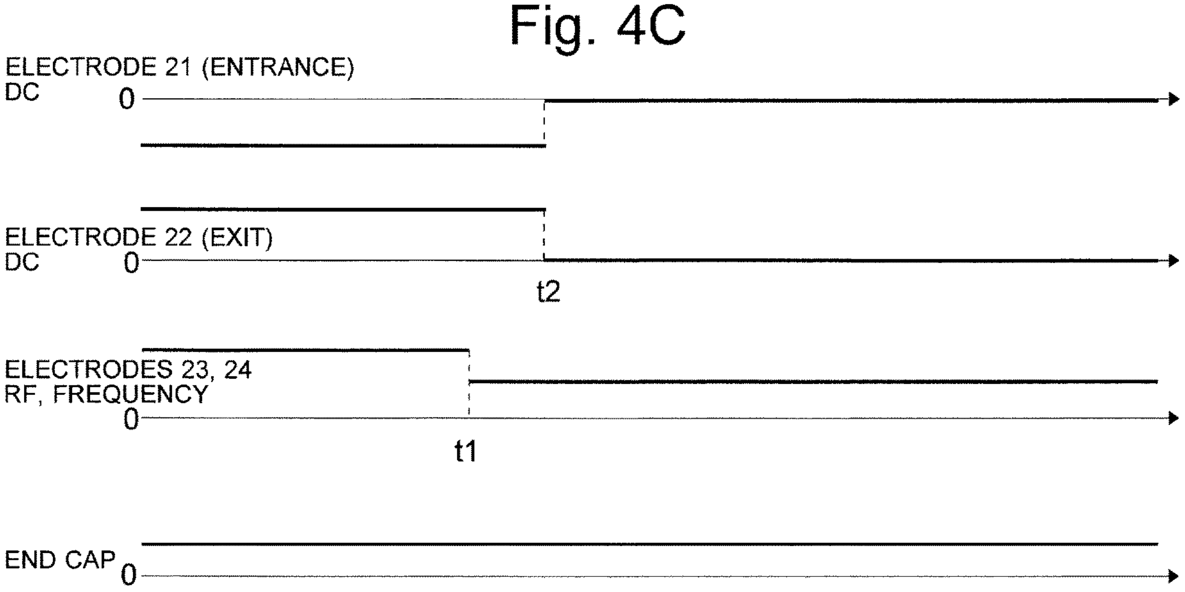
FIG. 4C is a chart showing another example of the voltages applied to the respective electrodes when ions are to be introduced and captured.

After the cooling of the ions has been performed, when the ions captured within the linear ion trap 2 are to be detected, the frequency of the drive pulses supplied from the timing signal generator 6 to the switching elements 43 and 44 is continuously changed, as shown in FIG. 4B. Thus, a scan of the frequency of the high rectangular voltage applied from the main power source 4 to the rod electrodes 23 and 24 is performed (from the point in time t3 in FIG. 4B). Meanwhile, the low rectangular voltages for resonance excitation are applied from the auxiliary power source 5 to the rod electrodes 21 and 22. The frequency of these voltages is continuously changed according to the frequency of the high rectangular voltage applied to the rod electrodes 23 and 24, as shown in FIG. 4B. Though not shown in FIG. 4B, the low rectangular voltage applied to the rod electrode 22 has a phase difference of 180 degrees from the phase of the low rectangular voltage applied to the rod electrode 21.

Consequently, an ion having a specific mass-to-charge ratio is selectively made to oscillate due to the resonance excitation and ejected through the ejection port 22*a*, to be detected by the ion detector 3.

The present invention is not limited to the previously described embodiment and can be appropriately changed or modified.

For example, in the previously described embodiment, the high rectangular voltage having the predetermined frequency begins to be applied to the rod electrodes 23 and 24 when the predetermined period of time t1 has passed since the introduction of the ions into the linear ion trap 2. FIG. 4C shows another possibility, in which the high rectangular voltage having the predetermined frequency is applied to the rod electrodes 23 and 24 from the beginning. When the predetermined period of time t1 has passed, the high rectangular voltage applied to the rod electrodes 23 and 24 is lowered to a specific value. This operation facilitates the introduction of ions into the inner space of the linear ion trap 2.

Figure 5:
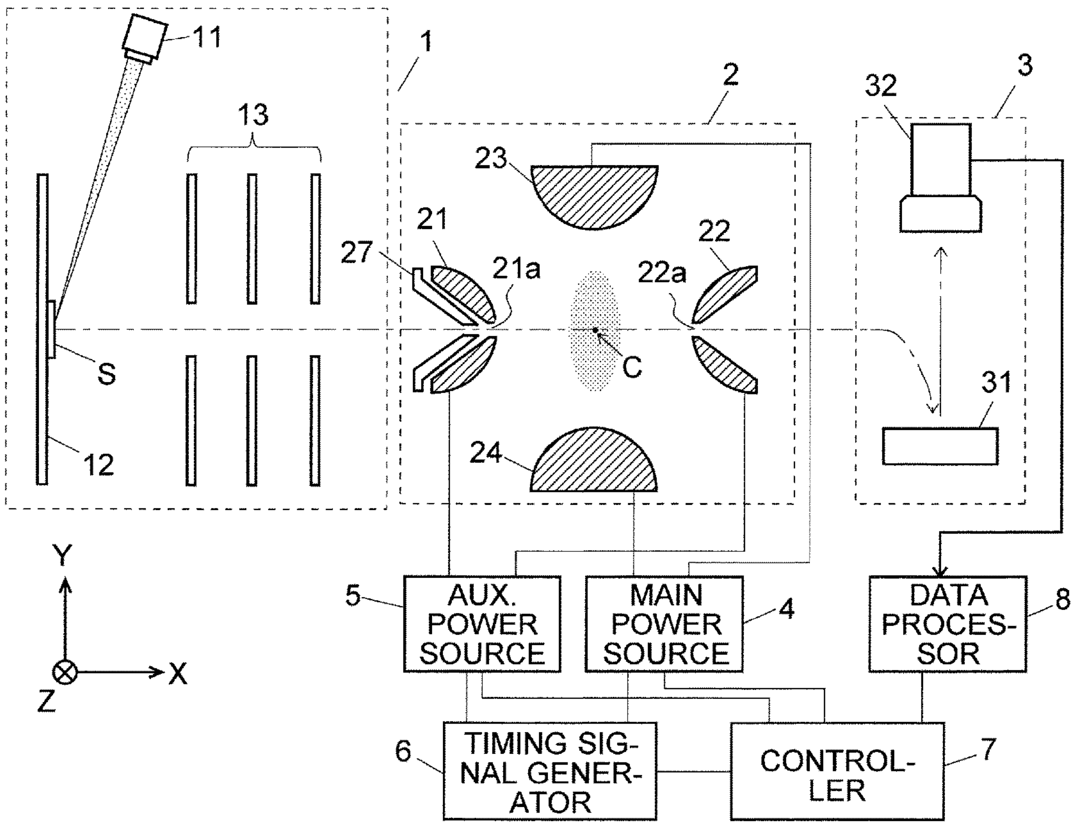
FIG. 5 is a schematic configuration diagram of a linear ion trap mass spectrometer as a modified example.

As another example, as shown in FIG. 5, an FAE electrode 27 may be located at the first rod electrode 21 on the side which faces the ionizer 1. A voltage for drawing ions into the inner space is applied from a voltage supplier (not shown) to the FAE electrode 27 at the timing to initiate the capturing of ions. At the timing to eject ions, a voltage for pushing the ions from the inner space to the outside is applied to the FAE electrode 27.

In the linear ion trap according to the present invention, no opening is formed in the pair of end electrodes. This means that an opening which should act as an ion introduction port or ion ejection port is not formed. This does not exclude the possibility of forming openings in the end electrodes, for example, in a system in which multiple linear ion traps are arranged in series along the central axis, with the neighboring linear ion traps having their respective inner spaces connected to each other through those openings.

[Various Modes]

A person skilled in the art can understand that the previously described illustrative embodiment is a specific example of the following modes of the present invention.

(Clause 1) A linear ion trap according to Clause 1 includes:

two first rod electrodes arranged so as to face each other across a central axis, each of the first rod electrodes having an opening;

two second rod electrodes arranged so as to face each other across the central axis, in a direction different from the direction in which the two first rod electrodes face each other;

a pair of end electrodes respectively arranged outside the two end faces of the two first rod electrodes and the two second rod electrodes;

a radio-frequency voltage supplier configured to apply a radio-frequency voltage for capturing ions to each of the two second rod electrodes;

an excitation voltage supplier configured to apply a voltage for resonance excitation to each of the two first rod electrodes; and a controller configured to control the radio-frequency voltage supplier and the excitation voltage supplier.

The linear ion trap according to Clause 1 does not require applying radio-frequency voltages having a phase difference of 180 degrees to any electrode in order to capture ions. Since the rod electrodes to which the radio-frequency voltage for capturing ions is applied are separated from the rod electrodes to which the voltage for resonance excitation is applied, it is unnecessary to superpose the voltage for resonance excitation on the radio-frequency voltages for capturing ions, as in the conventional linear ion trap. Therefore, the present linear ion trap can be operated with a power circuit which is simple in configuration.

(Clause 2) In the linear ion trap described in Clause 1, the controller may be configured so that:

when an ion having a predetermined mass-to-charge ratio is to be captured within a space surrounded by the two first rod electrodes, the two second rod electrodes and the pair of end electrodes, the controller controls the radio-frequency voltage supplier so as to apply, to each of the two second rod electrodes, a radio-frequency voltage having a frequency corresponding to the mass-to-charge ratio of the ion; and when an ion captured within the space is to be ejected, the controller controls the excitation voltage supplier so as to apply the voltage for resonance excitation to the two first rod electrodes while continuing applying the radio-frequency voltage to the two second rod electrodes by the radio-frequency voltage supplier.

In the linear ion trap according to Clause 2, after an ion or ions have been introduced from the opening in one of the two first rod electrodes into the inner space, the radio-frequency voltage for capturing ions is applied to the two second rod electrodes by the radio-frequency voltage supplier. The ions are thereby captured within the inner space. While the application of the radio-frequency voltage for capturing ions to the two second rod electrodes by the radio-frequency voltage supplier is continued in this state, the voltage for resonance excitation is applied to the two second rod electrodes by the excitation voltage supplier. This causes an ion having a mass-to-charge ratio corresponding to the frequency of the radio-frequency voltage to oscillate in an orthogonal direction to the central axis by resonance excitation and be ejected from one or both of the openings in the two first rod electrodes.

(Clause 3) In the linear ion trap described in Clause 1 or 2, the radio-frequency voltage for capturing ions may be a rectangular voltage, and the voltage for resonance excitation may be a rectangular voltage provided by dividing the frequency of the radio-frequency voltage for capturing ions with a predetermined division ratio, the latter rectangular voltage being lower in voltage than the radio-frequency voltage.

In the linear ion trap according to Clause 3, the electrodes are operated by a digital-driving system. Therefore, the frequency and/or duty cycle of the rectangular voltages applied to the first and second rod electrodes can be easily varied.

(Clause 4) In the linear ion trap described in Clause 3, the radio-frequency voltage supplier may include a first voltage source configured to generate a direct voltage, a second voltage source configured to generate a direct voltage different from the direct voltage generated by the first voltage source, a first switching section configured to turn on or off the direct voltage outputted from the first voltage source, and a second switching section configured to turn on or off the direct voltage outputted from the second voltage source, and the radio-frequency voltage supplier may be configured to generate the rectangular voltage by alternately turning on or off the first switching section and the second switching section.

In the linear ion trap according to Clause 4, the frequency of the radio-frequency voltage for capturing ions can be easily varied by changing the switching frequency of the on/off state of switching elements in the first and second switching sections. The duty cycle can also be easily varied by changing the timing to switch between the on/off states while maintaining the switching frequency of the switching elements.

(Clause 5) A method according to Clause 5 is a method for operating a linear ion trap including: two first rod electrodes arranged so as to face each other across a central axis, each of the first rod electrodes having an opening; two second rod electrodes arranged so as to face each other across the central axis, in a direction different from the direction in which the two first rod electrodes face each other; and a pair of end electrodes respectively arranged outside the two end faces of the two first rod electrodes and the two second rod electrodes, the method including:

applying, to each of the two second rod electrodes, a radio-frequency voltage having a predetermined frequency corresponding to the mass-to-charge ratio of an ion to be captured, when an ion is to be captured within an inner space of the linear ion trap; and applying a voltage for resonance excitation to each of the two first rod electrodes while applying the radio-frequency voltage to each of the two second rod electrodes, when an ion captured within the inner space of the linear ion trap is to be ejected.

REFERENCE SIGNS LIST

1 . . . Ionizer
11 . . . Laser Irradiator
12 . . . Sample Plate
13 . . . Ion Transport System
2 . . . Linear Ion Trap
21 . . . Rod Electrode
**21*a*** . . . Introduction Port
22 . . . Rod Electrode
**22*a*** . . . Ejection Port
23 . . . Rod Electrode
24 . . . Rod Electrode
25 . . . End Electrode
26 . . . End Electrode
3 . . . Ion Detector
31 . . . Conversion Dynode
32 . . . Secondary Electron Multiplier Tube
4 . . . Main Power Source
41 . . . First Voltage Source
42 . . . Second Voltage Source
43 . . . First Switching Element
44 . . . Second Switching Element
5 . . . Auxiliary Power Source
6 Timing Signal Generator
7 . . . Controller
8 . . . Data Processor

The invention claimed is:

1. A linear ion trap, comprising:

two first rod electrodes arranged so as to face each other across a central axis, each of the first rod electrodes having an opening;

two second rod electrodes arranged so as to face each other across the central axis, in a direction different from a direction in which the two first rod electrodes face each other;

a pair of end electrodes respectively arranged outside two end faces of the two first rod electrodes and the two second rod electrodes;

a radio-frequency voltage supplier configured to apply a radio-frequency voltage for capturing ions, the radio-frequency voltage supplier being electrically connected only to each of the two second rod electrodes among the two first rod electrodes and the two second rod electrodes;

an excitation voltage supplier configured to apply a voltage for resonance excitation, the excitation voltage supplier being electrically connected only to each of the two first rod electrodes among the two first rod electrodes and the two second rod electrodes; and a controller configured to control the radio-frequency voltage supplier and the excitation voltage supplier, wherein the controller is configured so that:

when an ion having a predetermined mass-to-charge ratio is to be captured within a space surrounded by the two first rod electrodes, the two second rod electrodes and the pair of end electrodes, the controller controls the radio-frequency voltage supplier so as to apply, only to each of the two second rod electrodes among the two first rod electrodes and the two second rod electrodes, a radio-frequency voltage having a frequency corresponding to the mass-to-charge ratio of the ion; and when an ion captured within the space is to be ejected, the controller controls the excitation voltage supplier so as to apply the voltage for resonance excitation only to each of the two first rod electrodes among the two first rod electrodes and the two second rod electrodes while continuing applying the radio-frequency voltage only to each of the two second rod electrodes by the radio-frequency voltage supplier, wherein one of the openings of the two first rod electrodes is an ion introduction port, and wherein one or both of the openings of the two first rod electrodes is an ion ejection port.

2. The linear ion trap according to claim 1, wherein:

the radio-frequency voltage for capturing ions is a rectangular voltage; and the voltage for resonance excitation is a rectangular voltage provided by dividing a frequency of the radio-frequency voltage for capturing ions with a predetermined division ratio, the latter rectangular voltage being lower in voltage than the radio-frequency voltage.

3. The linear ion trap according to claim 2, wherein:

the radio-frequency voltage supplier includes a first voltage source configured to generate a direct voltage, a second voltage source configured to generate a direct voltage different from the direct voltage generated by the first voltage source, a first switching section configured to turn on or off the direct voltage outputted from the first voltage source, and a second switching section configured to turn on or off the direct voltage outputted from the second voltage source; and the radio-frequency voltage supplier is configured to generate the rectangular voltage by alternately turning on or off the first switching section and the second switching section.

4. The linear ion trap according to claim 1, wherein:

the radio-frequency voltage for capturing ions is a rectangular voltage; and the voltage for resonance excitation is a rectangular voltage provided by dividing a frequency of the radio-frequency voltage for capturing ions with a predetermined division ratio, the latter rectangular voltage being lower in voltage than the radio-frequency voltage.

5. The linear ion trap according to claim 4, wherein:

the radio-frequency voltage supplier includes a first voltage source configured to generate a direct voltage, a second voltage source configured to generate a direct voltage different from the direct voltage generated by the first voltage source, a first switching section configured to turn on or off the direct voltage outputted from the first voltage source, and a second switching section configured to turn on or off the direct voltage outputted from the second voltage source; and the radio-frequency voltage supplier is configured to generate the rectangular voltage by alternately turning on or off the first switching section and the second switching section.

6. A method for operating a linear ion trap including: two first rod electrodes arranged so as to face each other across a central axis, each of the first rod electrodes having an opening; two second rod electrodes arranged so as to face each other across the central axis, in a direction different from a direction in which the two first rod electrodes face each other; and a pair of end electrodes respectively arranged outside two end faces of the two first rod electrodes and the two second rod electrodes, the method comprising:

applying, only to each of the two second rod electrodes among the two first rod electrodes and the two second rod electrodes, a radio-frequency voltage having a predetermined frequency corresponding to the mass-to-charge ratio of an ion to be captured, when an ion is to be captured within an inner space of the linear ion trap; and applying a voltage for resonance excitation only to each of the two first rod electrodes among the two first rod electrodes and the two second rod electrodes while applying the radio-frequency voltage only to each of the two second rod electrodes, when an ion captured within the inner space of the linear ion trap is to be ejected.

7. A linear ion trap mass spectrometer, comprising:

an ionizer configured to ionize a sample;

two first rod electrodes arranged so as to face each other across a central axis, each of the first rod electrodes having an opening, wherein one of the openings of the two first rod electrodes is an ion introduction port, and one or both of the openings of the two first rod electrodes is an ion ejection port;

two second rod electrodes arranged so as to face each other across the central axis, in a direction different from a direction in which the two first rod electrodes face each other;

a pair of end electrodes respectively arranged outside two end faces of the two first rod electrodes and the two second rod electrodes;

a radio-frequency voltage supplier configured to apply a radio-frequency voltage for capturing ions, the radio-frequency voltage supplier being electrically connected only to each of the two second rod electrodes among the two first rod electrodes and the two second rod electrodes;

an excitation voltage supplier configured to apply a voltage for resonance excitation, the excitation voltage supplier being electrically connected only to each of the two first rod electrodes among the two first rod electrodes and the two second rod electrodes;

a first rod electrodes direct voltage supplier configured to apply direct voltages of opposite polarities to each of the two first rod electrodes; and a controller configured to control the radio-frequency voltage supplier, the excitation voltage supplier, the ionizer, and the first rod electrodes direct voltage supplier, wherein the controller is configured so that:

the controller controls the ionizer so as to generate an ion;

while the ion generated in the ionizer is introduced through the introduction port into a space surrounded by the two first rod electrodes, the two second rod electrodes and the pair of end electrodes, the controller controls the first rod electrodes direct voltage supplier so as to apply direct voltages of opposite polarities to each of the two first rod electrodes, and the controller controls the radio-frequency voltage supplier so as to apply no voltage to each of the two second rod electrodes;

after a first predetermined period of time has passed since the ion is introduced into the space surrounded by the two first rod electrodes, the two second rod electrodes and the pair of end electrodes, when an ion having a predetermined mass-to-charge ratio is to be captured within the space surrounded by the two first rod electrodes, the two second rod electrodes and the pair of end electrodes, the controller controls the radio-frequency voltage supplier so as to apply, only to each of the two second rod electrodes among the two first rod electrodes and the two second rod electrodes, a radio-frequency voltage having a frequency corresponding to the mass-to-charge ratio of the ion;

after a second predetermined period of time has passed since the ion is introduced into the space surrounded by the two first rod electrodes, the two second rod electrodes and the pair of end electrodes, the controller controls the first rod electrodes direct voltage supplier so as to discontinue applying the direct voltages of opposite polarities to each of the two first rod electrodes; and when an ion captured within the space is to be ejected, the controller controls the excitation voltage supplier so as to apply the voltage for resonance excitation only to each of the two first rod electrodes among the two first rod electrodes and the two second rod electrodes while continuing applying the radio-frequency voltage only to each of the two second rod electrodes by the radio-frequency voltage supplier.

8. A method for operating a linear ion trap mass spectrometer including: an ionizer configured to ionize a sample, two first rod electrodes arranged so as to face each other across a central axis, each of the first rod electrodes having an opening, wherein one of the openings of the two first rod electrodes is an ion introduction port, and one or both of the openings of the two first rod electrodes is an ion ejection port; two second rod electrodes arranged so as to face each other across the central axis, in a direction different from a direction in which the two first rod electrodes face each other; and a pair of end electrodes respectively arranged outside two end faces of the two first rod electrodes and the two second rod electrodes, the method comprising:

generating an ion;

applying direct voltages of opposite polarities to each of the two first rod electrodes, and applying no voltage to each of the two second rod electrodes, while the ion is introduced through the introduction port into an inner space of the linear ion trap;

applying, only to each of the two second rod electrodes among the two first rod electrodes and the two second rod electrodes, a radio-frequency voltage having a predetermined frequency corresponding to the mass-to-charge ratio of an ion to be captured, when an ion is to be captured within the inner space of the linear ion trap, after a first predetermined period of time has passed since the ion is introduced into the inner space of the linear ion trap;

discontinuing applying the direct voltages of opposite polarities to each of the two first rod electrodes, after a second predetermined period of time has passed since the ion is introduced into the inner space of the linear ion trap;

applying a voltage for resonance excitation only to each of the two first rod electrodes among the two first rod electrodes and the two second rod electrodes while applying the radio-frequency voltage only to each of the two second rod electrodes, when an ion captured within the inner space of the linear ion trap is to be ejected.

* * * * *